July 15, 1969  C. M. SWEET  3,455,189
LATHE TURRET EQUIPPED WITH AUTOMATIC ADJUSTING TANDEM TOOLS
Filed Sept. 8, 1960  5 Sheets-Sheet 1
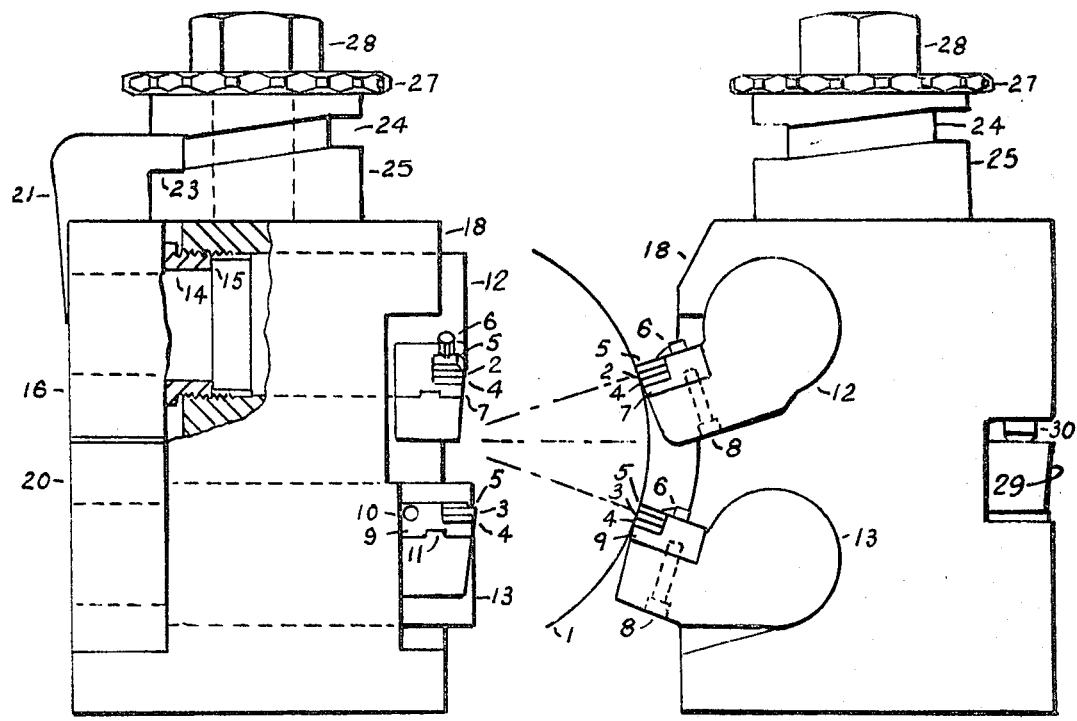
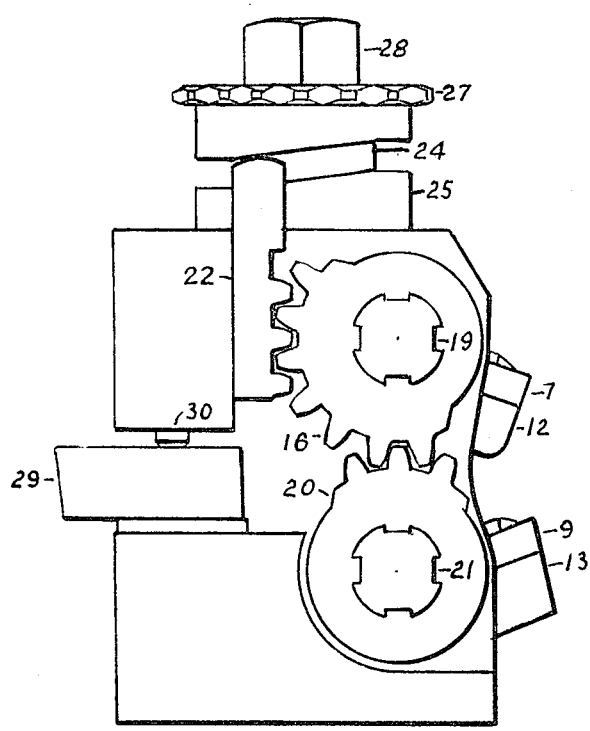
INVENTOR.
Corliss M. Sweet INVENTOR.
Corlise M. Sweet July 15, 1969  C. M. SWEET  3,455,189
LATHE TURRET EQUIPPED WITH AUTOMATIC ADJUSTING TANDEM TOOLS
Filed Sept. 8, 1960  5 Sheets-Sheet 3

INVENTOR.
Corlisc M. Sweet

July 15, 1969  C. M. SWEET  3,455,189
LATHE TURRET EQUIPPED WITH AUTOMATIC ADJUSTING TANDEM TOOLS
Filed Sept. 8, 1960  5 Sheets-Sheet 4

INVENTOR.
Corliss M. Sweet

July 15, 1969 C. M. SWEET 3,455,189
LATHE TURRET EQUIPPED WITH AUTOMATIC ADJUSTING TANDEM TOOLS
Filed Sept. 8, 1960 5 Sheets-Sheet 5

INVENTOR.
Corlise M. Sweet

United States Patent Office 3,455,189
Patented July 15, 1969

3,455,189
LATHE TURRET EQUIPPED WITH AUTOMATIC
ADJUSTING TANDEM TOOLS
Corlise M. Sweet, 1000 E. Montana St.,
Milwaukee, Wis. 53207
Filed Sept. 8, 1960, Ser. No. 54,609
Int. Cl. B23b 7/00
U.S. Cl. 82—1                                13 Claims This invention relates to tandem turning in a lathe and especially to a tandem tool arrangement in which the tools will automatically adjust their cutting edges for turning the larger diameter workpieces.

In patent applications No. 264,548 filed Jan. 2, 1952 and now abandoned, No. 654,247 filed Apr. 22, 1957, now Patent No. 3,078,547, No. 30,902 filed May 23, 1960, now abandoned, and No. 43,218 filed July 15, 1960, now abandoned, it was shown how tandem tools could increase the speed of metal removal, increase tool life, make it possible to use harder cutting materials, and turn workpieces more uniform in size.

In patent applicaton 264,548 filed Jan. 2, 1952 it was shown how the cutting elements in tandem turning tools could be rotated for turning various size diameters. In patent application No. 30,902 filed May 23, 1960 it was shown how tandem turning tools could be made to automatically adjust for turning workpieces. There is also a need for a tandem tusning tool that is quickly adjustable or automatically adjustable for turning a wide range of diameter workpieces in a lathe or vertical boring mill.

It is therefore an object of this invention to provide a tandem lathe tool that can be mounted on a slide or carriage of the lathe that can be quickly adjustable for turning various size diameters.

A further object is to provide the tandem tool with means of automatically adjusting itself for turning various size diameters.

Another object is to mount the automatic adjusting tandem tool in a turret in such a way that the lathe operator can cut with the tandem tool and then quickly index the turret and use other cutting elements to do other cutting operations on the workpiece.

Another object is to connect the shanks of the cutting elements by gears in such a way that the pressure of one cutting element counter balances the pressure of the other cutting element, and in this way reduces the effort to rotate the cutting elements when the cutting elements are turning a tapered workpiece.

A further object is to provide an easy adjustment for changing the feed rate of one cutting element with respect to another cutting element.

Another object is to provide the tandem tool with insert cutting elements that can be indexed or thrown away, and by so doing eliminate the adjustment of one cutting element with respect to another cutting element when wear takes place.

A still further object is to provide special shanks for the cutting elements that can be used to adjust the cutting elements radially and can easily be replaced when the surfaces holding the insert cutting elements become worn.

In the drawings:

FIGURE 1 is a schematic side elevation of a tandem turning tool mounted in a square turret with one round shank cutting element mounted above the workpiece centerline and another round shank cutting element mounted an equal distance below the centerline, a cam on top of the turret, a sprocket gear to turn the cam, and another single cutting element shown in the turret.

FIGURE 2 is a schematic side elevation of FIGURE 1 looking at it from the left-hand side showng the threaded means of adjusting the top cutting element with respect to the bottom cutting element and the cam follower engaged in the cam on top of the turret.

FIGURE 3 is a schematic side elevation of FIGURE 2 looking at it from the left-hand side showing the shanks of the cutting elements connected by gears and a cam follower with a rack on one end that mechanically connects the cam on top of the turret to a gear on the shank of one of the cutting elements.

Figure 4:
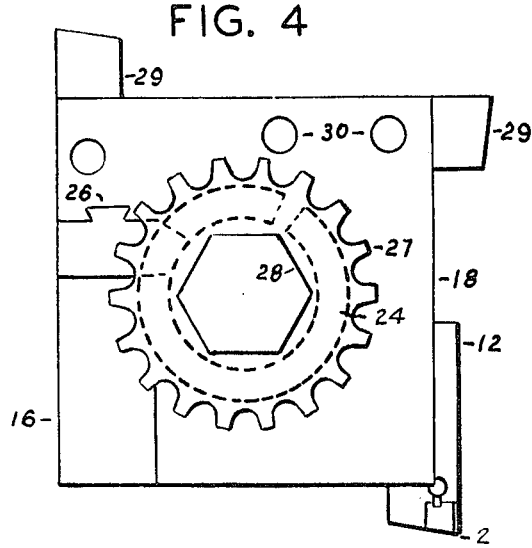
FIGURE 4 is a schematic plan view of FIGURE 1, 2, and 3 showing the cutting elements, the sprocket to turn the cam, and the dove tail groove in which the cam follower slides.

In the construction of FIGURES 1, 2, 3 and 4 the workpiece is being turned by insert cutting elements 2 and 3. Insert cutting element 2 is supported on a hard shim 4 and has a chip breaker 5 that is held by clamp 6. All of this is held in a replaceable shank 7. The replaceable shank 7 is held in place by cap screw 8. The lower replaceable shank 9 has an adjusting screw 10 to adjust shank 9 along groove 11. This is a very small adjustment and is placed here to compensate for inaccuracies and wear in the lathe.

The shanks 7 and 9 are carried by rotating shanks 12 and 13. Rotating shank 12 supports a threaded part 14 that is placed between the shoulder 15 and the gear 16. Adjustment of this threaded part 14 with a spanner wrench on threads 17 in turret 18 moves rotating shank 12 along its axis and adjusts cutting element 2 sideways with respect to cutting element 3.

In order to obtain maximum metal removal cutting element 3 should be set beyond cutting element 2 in the direction the carriage is feeding an amount equal to one-half the feed of the carriage for one revolution of the workpiece. This is explained in detail in application 30,902 filed May 23, 1960.

The shanks 12 and 13 have a mechanical means of simultaneously rotating them so that the faces of the cutting elements are radial with the rotation center of the lathe. The mechanical means in FIGURES 1 to 4 consists of gears that are driven by a cam. Shank 12 has a gear 16 that is pressed on its end and held from rotating by a spline 19. Shank 13 has a gear 20 pressed on its end and is prevented from rotating by spline 20. Rack 22 rotates upper gear 16. Rack 22 is part of the cam follower and has a section 23 that engages the cam slot 24 in cam 25. The cam follower slides in a dove tail groove 26. The cam 25 has a sprocket gear 27 machined on one end that revolves the cam. The cam 25 is held in the turret by nut 28.

It should be noted that the slope of the cam slot 24 is not uniform. The reason it is not uniform is that the cutting elements 12 and 13 rotate a greater amount when changing from a small diameter to another small diameter than they do when changing the same amount on larger diameter.

The turret 18 has other cutting elements 29 that are held down by screws 30.

Figure 5:
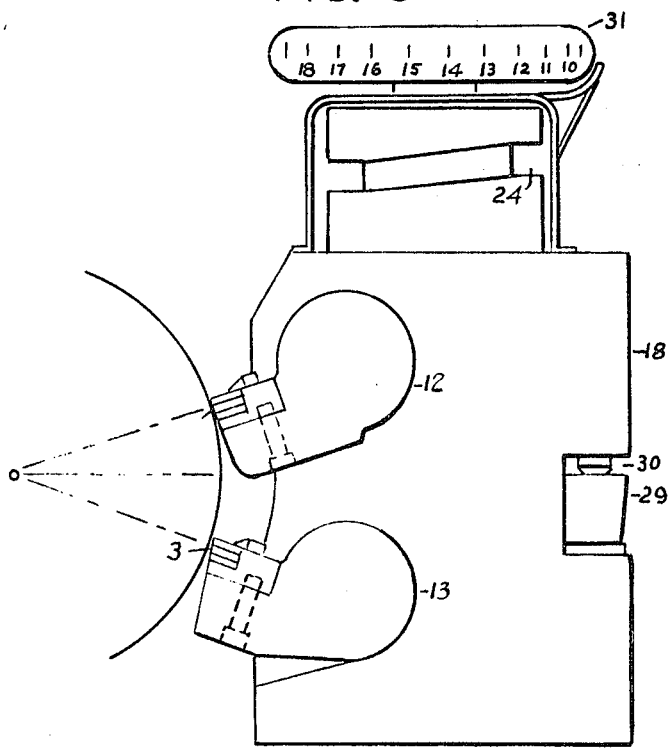
FIGURE 5 is a schematic side elevation, of a turret that is the same as FIGURES 1, 2 and 3 with the exception that it has a graduated handwheel on top instead of a sprocket to rotate the cutting elements for cutting different size diameters.

In FIGURE 5 is shown a hand wheel 31 that can be used to rotate shanks 12 and 13 for turning various size diameters. The hand wheel has graduations marked on it for various diameter workpieces. In operation the lathe operator would line up the graduation mark for the diameter that is to be turned with the pointer. This device permits the lathe operator to change the position of the cutting elements in a few seconds' time. It would be used on large lathes or vertical boring mills on which it is not necessary to rotate the cutting elements often.

When a faster method of moving the cutters is desired a geared motor that is controlled by limit switches could be mounted above the wheel 31. The lathe operator could preset the control for rotating the cutters so that when the lathe finished turning one diameter the electric motor would automatically adjust the cutters for the next diameter to be turned, and in that way no time would be lost. This would be similar to the method of presetting the feeds and speeds that is now used on some lathes. If desired the setting of the cutters could be placed on the same control that sets the speed. In lathes that are tape controlled the motor that adjusts the cutters could be controlled by the tape.

In the hand wheel controlled tandem tool of FIGURE 5 the gears 16 and 20 could be changed to worm wheels, and be mechanically connected by a worm gear having a right- and left-hand thread. This would require changing rack 22 to a worm having a right- and left-hand thread to drive rotating shanks 12 and 13 in opposite directions, a gear on the end of the worm, and another gear to take the place of cam 25 and mesh with the gear on the worm. This worm gear drive would be self-locking and in some instances would have advantages over the cam arrangement.

Figure 6:
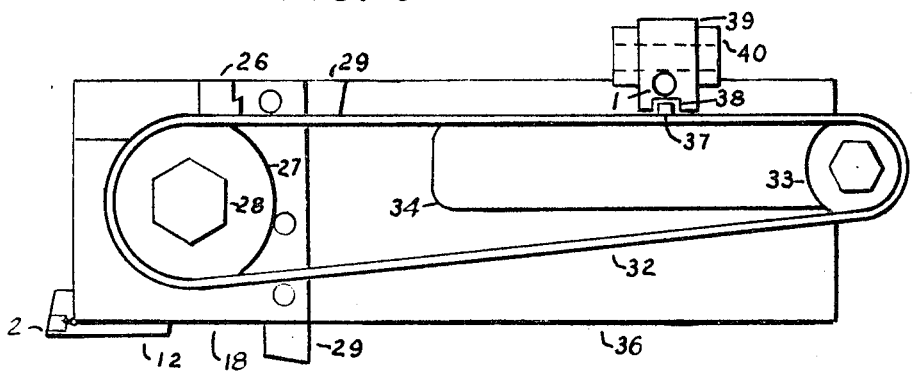
FIGURE 6 is a schematic plan view of the square turret in FIGURE 4 showing the sprocket gear connected by a chain to a stationary part on the lathe, and the means to disconnect the chain when the square turret is rotated to position another cutting element for doing another cutting operation on the workpiece.
Figure 7:
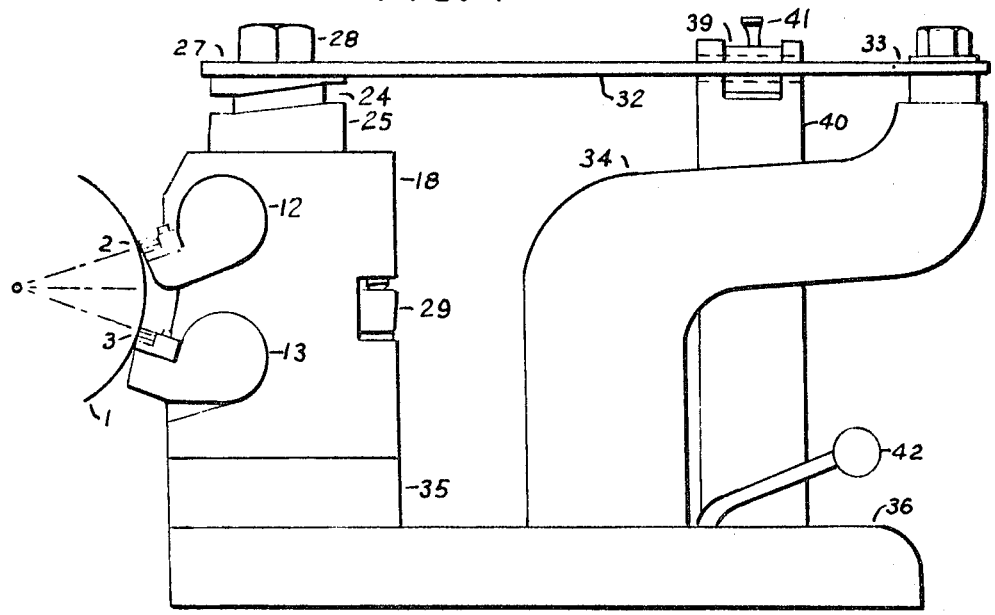
FIGURE 7 is a schematic side elevation of FIGURE 6 showing the workpiece, the tandem cutting elements, the cam that moves the cutting elements, the sprocket that moves the cam, the chain that anchors the sprocket to the stationary part on the lathe, and the lever to index the turret.

FIGURES 6 and 7 show a means of gearing the movement of the cam to the movement of the cross slide on the carriage so as to automatically adjust the cutting elements for the diameter that is to be turned. It consists of a sprocket gear drive. The chain 32 is placed over the sprocket gears 27 and 33. Sprocket 33 is on a pedestal 34. Pedestal 34 and turret index mechanism 35 are mounted on a cross slide 36. The cross slide is mounted on the carriage and is propelled toward or away from the center of the lathe. The means of propelling the cross slide can be by means of a screw or by other means that tracer controlled lathes use.

The chain 32 has an attachment 37 that fits in a slot 38. This slot is on a hinged part 39 that is attached to part 40. Part 40 is attached to the carriage of the lathe and moves with the carriage parallel to the lathes center of rotation but it can not move toward or away from the center of rotation. Attachment 37 holds the chain stationary and rotates the sprocket 27 as the turret 18 moves toward or away from the lathe center of rotation. Rotation of the sprocket 27 causes the shanks 12 and 13 to revolve so their cutting edges are always radial to the center of rotation. This is explained in greater detail in the description of FIGURES 11 and 12.

When it is desired to use one of the other cutting elements 29 in the turret 18 the knob 41 would be lifted which would disengage the chain attachment 37. The turret indexing lever 42 would be moved to disengage the turret indexing mechanism 35 and the turret would be rotated to the desired position for using one of the cutting elements 29. When it is desired to again use the tandem cutting elements 2 and 3 the turret would be indexed to the position shown in FIGURE 6, the knob 41 would rotate hinged part 39 to allow it to touch the chain. The cross slide 36 would then be moved by rapid traverse so that attachment 37 was moving toward slot 38. Part 39 is tapered on both sides of the slot 38. When attachment 37 arrives at part 39, the taper on part 39 causes part 39 to rise. When attachment 37 is in line with slot 38 part 39 falls and locks the chain in place.

The size of the lathe or the amount of movement of the carriage to and from the lathe center of rotation will determine the size of the sprocket gear 27. In the design shown the sprocket should be of such diameter that the travel of the carriage for turning will equal about eighty-five percent of the sprocket circumference. When the amount of travel is large, as it could be for some vertical boring mills, a gear unit can be installed to decrease the size of the sprocket gear. The gear reduction unit could consist of a shaft with a small sprocket gear and a larger gear mounted on it. The larger gear would mesh with a stationary rack on the lathe, and the smaller sprocket gear would take the place of part 39 and mesh with the chain 32. In this way the amount of movement of the sprocket 27 can be reduced and hence a smaller sprocket can be used.

In the above the chain and sprocket gears have been placed above the turret. If desired the chain and sprockets, or a rack, could be placed below the turret.

Figure 8:
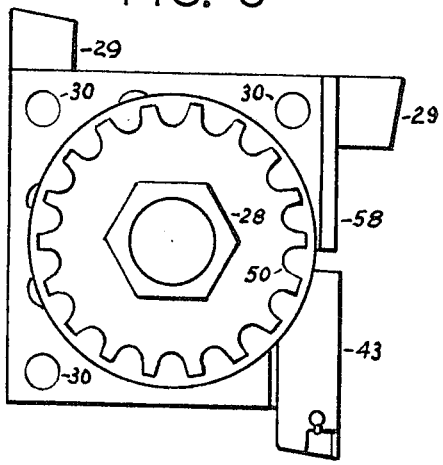
FIGURE 8 is schematic plan view of another square turret that has automatic adjusting tandem cutting elements.
Figure 9:
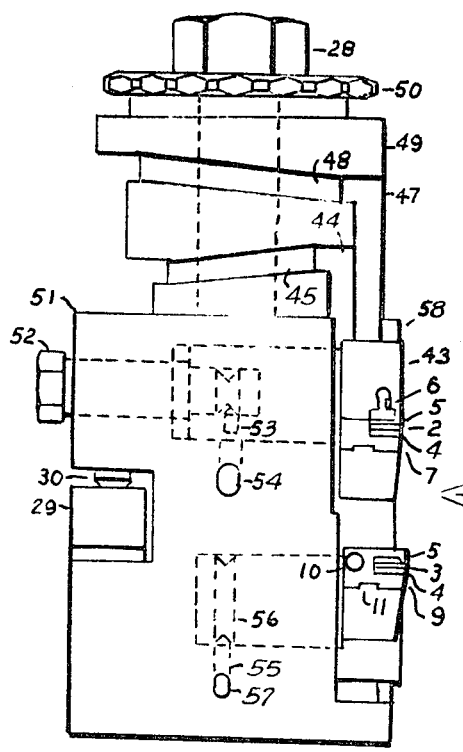
FIGURE 9 is a schematic side elevation of FIGURE 8 showing an end view of two tandem cutting elements, means of adjusting the upper cutting element sideways with respect to the lower cutting element, the cams to rotate the cutting elements, and the sprocket gear to move the cam.
Figure 10:
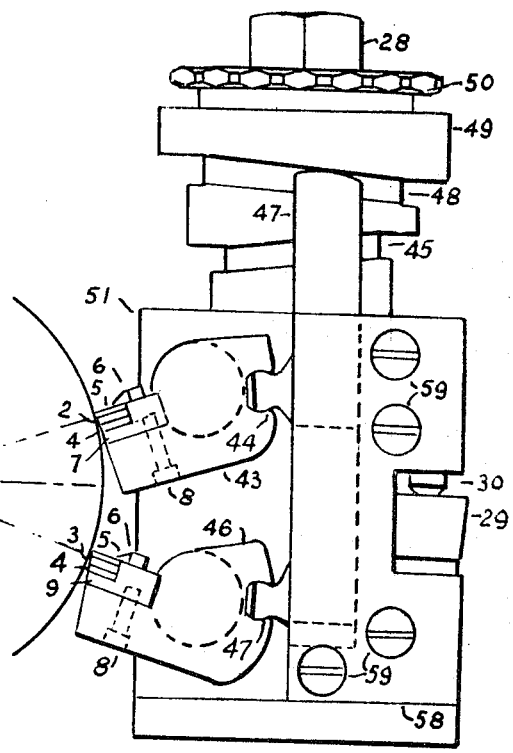
FIGURE 10 is a schematic side elevation of FIGURE 9 looking at it from the right-hand side showing the cutting elements, the cam followers that rotate the cutting elements, the sprocket that moves the cam, and another cutting element in the square turret.

The construction shown in FIGURES 8, 9, and 10 is similar to the construction of FIGURES 1, 2, 3, and 4. The main difference is that each cutting element is controlled by a separate cam. The means of automatically adjusting the cutting elements 2 and 3 can be done with a geared motor as described, or by mechanically connecting the cam sprocket gear to the carriage as illustrated in FIGURES 6 and 7.

Control of the cutting elements is as follows. Rotating shank 43 is moved by cam follower 44 that is controlled by cam slot 45. Rotating shank 46 is moved by cam follower 47 and is controlled by cam slot 48. The cam 49 has a sprocket 50 machined on one end and is rotated by the chain 32. Cam 49 is held down by nut 28. If desired nut 28 could be a bolt.

Cutting element 2 is adjusted sideways with respect to cutting element 3 by bolt 52. Bolt 52 is held to rotating shank 43 by pointed set screw 53. Hole 54 provides an opening for loosening screw 53. Rotating shank 46 is held in place by screw 55 that engages the groove 56. Hole 57 is tapped for screw 55.

When it is desired to change the shape of the cutting elements it can be easily done by loosening screws 53 and 55 and replacing rotating shanks 43 and 46 with other cutting elements having other shapes.

The cam followers 44 and 47 are held in place by cover plate 58, that is held in place by countersunk screws 59.

Figure 11:
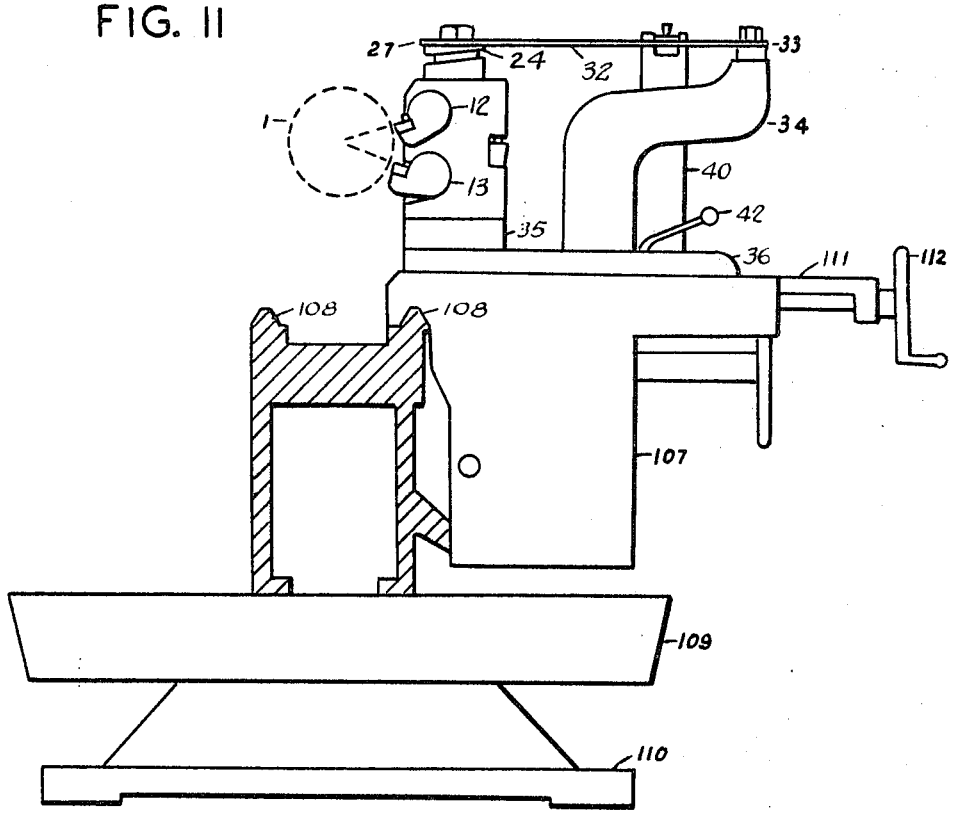
FIGURE 11 is a cross section of a lathe that is taken between the lathe chuck and the carriage showing how the mechanism in FIGURE 7 would appear when it is mounted on a lathe carriage and adjusted to cut a comparatively small diameter workpiece.

FIGURE 11 shows the mechanism in FIGURES 6 and 7 mounted on a lathe carriage 107. The lathe has conventional ways 108, a conventional pan 109 that holds the chips and liquid to cool the workpiece, and conventional legs 110 to support the lathe. The carriage 107 has a slide 111 that has conventional grooves on which the slide can move at right angles to the lathe ways 108. A conventional turret mechanism 35 and a lever 42, to operate the turret, is mounted on the slide 111. The slide is moved towards and away from the lathe's center of rotation with a conventional wheel 112 that rotates a conventional screw not shown. The part 40 that holds the chain 32 is mounted on a stationary section of the carriage 107 and it does not move towards or away from the lathe's center of rotation with the slide 111.

Figure 12:
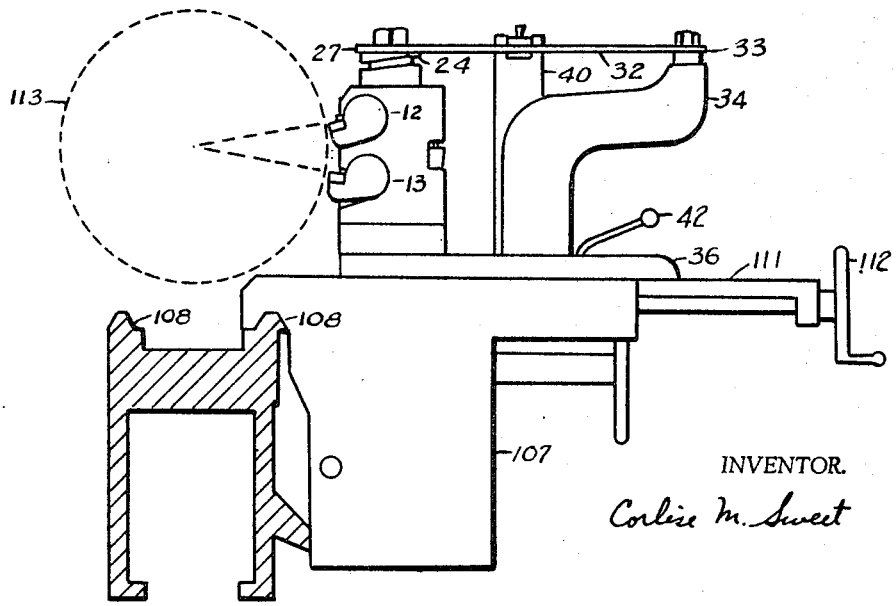
FIGURE 12 is a partial cross section similar to FIGURE 11 showing how the cutting elements have rotated when the carriage is adjusted to cut a larger diameter workpiece.

FIGURE 12 shows the carriage slide 111 moved away from the lathe center of rotation to provide space for a larger diameter workpiece 113. It will be noted that part 40, which holds the chain 32, has not moved from the position it occupied in FIGURE 11. It will also be observed that the shanks 12 and 13 have rotated a small amount thereby increasing the distance between the cutting elements 2 and 3 and changing the angles of the cutting elements with respect to each other. It will be further observed that the top surface of the cutting elements 2 and 3 are approximately radial with the lathe center of rotation in both FIGURES 11 and 12.

The operation of moving the turret from the position shown in FIGURE 11 to the position shown in FIGURE 12 would consist of the following. The wheel 112, which is fastened to a screw thread, would be rotated counterclockwise. The screw would move the slide 111, the turret 18, and the pedestal 34 from the position shown in FIGURE 11 to the position shown in FIGURE 12. Part 40 would remain stationary and prevent chain 32 from moving with slide 111. Chain 32 being held it would cause sprockets 27 and 33 to revolve counterclockwise. Cam slot 24, in FIGURE 3, would rotate with sprocket 27. This would cause cam follower 22 to move vertically down and rotate gears 16 and 20. Gears 16 and 20 would rotate shanks 12 and 13. The rotating shanks 12 and 13 rotate cutting elements 2 and 3 to the correct angle for cutting the larger workpiece 113. In this way the cutting elements 2 and 3 are automatically adjusted for cutting at the correct angle when the turret is moved to various distances from the lathe center of rotation.

The above illustrations have shown two cutting elements engaged in turning a workpiece. On large diameter workpieces, such as are machined on vertical boring mills, each rotating shank could have two cutting elements instead of one, similar to that shown in application 43,218 filed July 15, 1960. This would permit cutting with four cutting elements instead of two.

The tandem tools described here could be furnished as part of the lathe or they could be furnished as an attachment to the lathe. When furnished as an attachment the complete cross slide 36, with turret mounted on it, shown in FIGURE 7, could be placed on the lathe. On other lathes it may be preferred to use only the turret shown in FIGURE 5, or only a tool holder with a mechanical means of simultaneously rotating the cutting elements.

People who have seen the tandem turning designs usually state that the tools will greatly increase the size and horsepower of the lathe. This is not necessarily true for all workpieces. The average production lathe is usually built to cut at least one-half inch depth of cut. Many castings and forgings only have one-quarter inch of metal to be removed. Therefore the lathe is often operated at one-half its horsepower capacity. Using the tandem tools described here two cutting elements, each taking one-quarter inch depht of cut, can use the same horsepower as one cutting element taking one-half inch depth of cut. In this way a lathe having a given frame and horsepower can double its cutting capacity on many jobs by the use of these tools.

In the above it has been the intention to show a simple practical method of using tandem cutting elements on many styles of lathes. It is believed this has been done. The extra cost of the tools for the complete lathe is small in comparison to the faster rate of metal removal. All of the designs show means of rotating the cutting elements to cause them to be positioned at the correct angle for cutting various size diameters. The turret in FIGURES 1, 2, 3, and 4 shows a mechanism for rotating the cutting elements with a sprocket. FIGURES 8, 9, and 10 show how individual cams can be used to rotate the cutting elements with a sprocket. A sprocket is not sufficient to operate either of these mechanisms. They must be geared to the carriage slide, or rotated by a wheel, or rotated by a motor. FIGURE 5 shows how figures 1, 2, 3 and 4 can be operated by a wheel. FIGURES 6 and 7 show how FIGURES 1, 2, 3, and 4 can be geared to the lathe carriage cross slide and made to operate automatically with the movement of the slide. FIGURES 11 and 12 show how the mechanism for automatically adjusting the cutting elements can be assembled on a lathe. The parts are all rigidly supported, and they can be adjusted for wear or they can be replaced. The turrets are small, and the cutting elements will cut up to any shoulder on the workpiece without interference from projecting parts on the turret.

I claim:
1. The method of cutting more than one diameter on a large workpiece in a lathe with a tandem turning tool, comprising cutting a workpiece with at least two tandem cutting elements said cutting elements are held one above the other one one side of the workpiece, said cutting elements cut on substantially the same workpiece diameter, at least one of said cutting elements is offset beyond a cutting element above it in a direction the cutting elements move when cutting moving said cutting elements along the longitudinal length of the workpiece whereby at least two of the cutting elements will cut separate helical paths on the workpiece circumference, and when it is desired to cut a larger diameter move the tool holder that holds the cutting elements to a greater distance from the lathe's center of rotation, and after the tool has moved simultaneously adjust the cutting elements whereby their top faces are approximately radial with the lathe's center of rotation, and continue cutting the workpiece by moving the other on one side of the workpiece, said cutting elethe cutting elements along the longitudinal length of the workpiece thereby by using said tandem cutting elements that can be quickly adjusted for cutting different size diameters metal can be removed much faster from a workpiece than with a single cutting element and in which the tool holder and the cutting elements are all adjusted simultaneously when a different diameter is to be turned thereby further reducing the time required to turn a workpiece.

2. In a turning apparatus combination having a workpiece center of rotation, a carriage, a cross slide mounted on the carriage, and a tandem cutting tool mounted on the cross slide; said tandem tool comprising a holder containing two cutting element assemblies in one surface thereof, each having rotatable shanks mounted one above the other in approximate parallelism with the said center of rotation, said cutting element assemblies having means at one end of said shanks holding cutting tips having cutting points, edges and faces, said tips being oriented radially and equidistantly from the said center of rotation, the tip of the lowermost assembly axially leading the uppermost of the said assemblies in a direction of axial traverse; and rotatable adjusting means interconnecting said shanks, said slide and said carriage whereby when the cutting elements are adjusted for cutting at a different distance from the lathe's center of rotation the said cutting tips are automatically and simultaneously adjusted to maintain their equal radial distance from the said center of rotation and the said faces thereof are presented at the proper angle with respect to the said distance.

3. The structure of claim 2 wherein the holder is a multi-station turret containing single cutting element assemblies in other surfaces thereof in an on-center relationship with said center of rotation and wherein said adjusting means has a connection-disconnection interlock between said shanks and said carriage whereby said single assemblies can be indexed into working position upon disconnection of said rotatable adjusting means from said carriage.

4. The structure of claim 2 wherein the rotatable adjustment means includes a sprocket to actuate adjustment of said shanks and wherein said sprocket is actuated by a chain having a connection with said slide and said carriage whereby the slide is adjusted at different distances from the said center the said cutting tips on said shanks are rotated for presenting said faces at their proper cutting angle for the said different distances.

5. The structure of claim 2 wherein the holder is a turret having apertures in other surfaces thereof for holding other tool assemblies and wherein the said shanks are round and are received in corresponding round openings in said one surface at least one of said round shanks being rotatable by a cam follower connected to a cam and said cam being geared to movement of the said slide on said carriage.

6. In a turning apparatus combination having a workpiece center of rotation and a cross slide; a tandem cutting tool comprising a holder having two cutting element assemblies mounted one above the other, said cutting element assemblies having means at one end of holding cutting tips having points, edges and faces; said tips being oriented radially and equidistantly from the said center of rotation, the tip of the lowermost assembly axially leading the tip of the uppermost assembly in a direction of axial traverse, and operational means interconnecting the said assemblies to simultaneously adjust the same to the proper cutting for varying radii from the said center of rotation.

7. The structure of claim 6 wherein the said operational means includes a graduated hand wheel.

8. A tandem cutting tool for turning machines having spaced cutting element assemblies with cutting points, edges and faces, and means for adjusting said cutting elements in unison an equal distance above and below a common bisector plane such that the cutting elements will be disposed at the correct angle for cutting at different distances from the lathe's center of rotation, said tool comprising a holder, at least two cutting element assemblies carried by said holder in a one above the other relationship, a cutting edge of each successive assembly being offset from the one immediately thereabove in the direction of conventionally intended feed traverse of said tools when in use; and said adjusting means including a common mechanical actuator that interconnects said assemblies, whereby the said adjustment means simultaneously presents the said cutting elements at the correct angle for cutting and at equal distances from said bisector plane and whereby said offset provides a means of splitting a chip load of the intended traversal feed rate.

9. The structure of claim 8 wherein said cutting element assemblies have round shanks rotatably received in said holder and the said adjustment means interconnects said shanks.

10. The structure of claim 9 wherein the said shanks are interconnected by a gear arrangement thereby counterbalancing forces on said shanks.

11. The structure of claim 9 wherein said shanks are connected to cam followers and the said shank cam followers are connected to an adjusting cam means.

12. The structure of claim 11 wherein the said cam means is driven by a chain connected therewith.

13. The structure of claim 11 wherein the said cam means is driven by a graduated hand wheel connected therewith.

References Cited

UNITED STATES PATENTS

| | | | |
|---|---|---|---|
| 338,291 | 3/1886 | O'Neil | 82—25 |
| 1,503,995 | 8/1924 | Perkins et al. | 82—25 |
| 1,949,512 | 3/1934 | Norton | 29—28 |
| 2,238,019 | 4/1941 | Floeter | 82—25 |
| 2,499,509 | 3/1950 | Kendall | 82—25 |
| 2,505,684 | 4/1950 | McClernon | 82—36 |

FOREIGN PATENTS

| | | |
|---|---|---|
| 116,604 | 1/1901 | Germany. |
| 913,604 | 6/1954 | Germany. |
| 19,607 | 10/1901 | Great Britain. |

HARRISON L. HINSON, Primary Examiner

U.S. Cl. X.R.

82—2, 36

UNITED STATES PATENT OFFICE
CERTIFICATE OF CORRECTION

Patent No. 3,455,189                                               July 15, 1969

Corlise M. Sweet

It is hereby certified that error appears in the above numbered patent requiring correction and that the said Letters Patent should read as corrected below.

Column 1, lines 16 to 18, "No. 30,902 filed May 23, 1960, now abandoned, and No. 43,218 filed July 15, 1960, now abandoned," should read -- No. 30,902 filed May 23, 1960, now Patent No. 3,187,611, and No. 43,218 filed July 15, 1960, now Patent No. 3,145,600, --. Column 3, lines 2 and 3, "application 30,902 filed May 23, 1960" should read -- Patent No. 3,187,611 --. Column 5, lines 47 and 48, "application 43,218 filed July 15, 1960" should read -- Patent No. 3,145,600 --. Column 6, line 28, "one", first occurrence, should read -- on --; line 42, cancel "the other on one side of the workpiece, said cutting ele-".

Signed and sealed this 4th day of November 1969.

(SEAL)
Attest:

EDWARD M. FLETCHER, JR.                        WILLIAM E. SCHUYLER, JR.
Attesting Officer                                   Commissioner of Patents